(12) United States Patent
Gottschalk-Gaudig et al.

(10) Patent No.: US 7,541,405 B2
(45) Date of Patent: Jun. 2, 2009

(54) AQUEOUS POLYMER DISPERSIONS

(76) Inventors: Torsten Gottschalk-Gaudig, Wöhlestr. 16, D-84489 Burghausen (DE); Herbert Barthel, Lessingstr. 13, D-84547 Emmerting (DE); Uwe Scheim, Romerstr. 4, D-01640 Coswig (DE)

( * ) Notice: Subject to any disclaimer, the term of this patent is extended or adjusted under 35 U.S.C. 154(b) by 699 days.

(21) Appl. No.: 10/970,813

(22) Filed: Oct. 21, 2004

(65) Prior Publication Data

US 2005/0107520 A1 May 19, 2005

(30) Foreign Application Priority Data

Oct. 22, 2003 (DE) ................... 103 49 082

(51) Int. Cl.
| | |
|---|---|
| C08L 31/00 | (2006.01) |
| C08L 83/00 | (2006.01) |
| C08L 83/04 | (2006.01) |
| A61Q 19/00 | (2006.01) |
| C08G 77/14 | (2006.01) |

(52) U.S. Cl. ................. 524/559; 524/588; 524/731; 524/863; 524/783; 524/786; 528/18; 528/33

(58) Field of Classification Search ............... 524/559, 524/588, 731, 863, 783, 786; 528/18, 33, 528/901

See application file for complete search history.

(56) References Cited

U.S. PATENT DOCUMENTS

| | | | |
|---|---|---|---|
| 4,005,044 A | 1/1977 | Raleigh | |
| 4,184,880 A | 1/1980 | Huber et al. | |
| 4,221,688 A | 9/1980 | Johnson et al. | |
| 4,427,811 A | 1/1984 | Elias et al. | |
| 4,618,642 A * | 10/1986 | Schoenherr | 524/425 |
| 4,892,907 A * | 1/1990 | Lampe et al. | 524/731 |
| 5,162,429 A | 11/1992 | Burns et al. | |
| 5,998,536 A * | 12/1999 | Bertry et al. | 524/557 |

FOREIGN PATENT DOCUMENTS

| | | |
|---|---|---|
| DE | 26 26 942 A | 12/1976 |
| DE | 26 41 699 A | 3/1978 |
| DE | 43 40 400 A1 | 1/1995 |
| EP | 0 365 439 A | 4/1990 |
| EP | 0 665 882 | 4/1994 |

OTHER PUBLICATIONS

U.S. 4,184,880 corresponds to DE 26 41 699 A.
U.S. 4,005,044 corresponds to DE 26 26 942 A.
Derwent Abstract corresponding to DE 43 40 400 A1 in English.
Derwent Abstract corresponding to EP 0 365 439 A1 in English.
Lloyd, D.R., et al., "Inverse Gas Chromatography—Characterization of Polymers and Other Materials," ACS Symposium Series, 1989, pp. 248-261 (Chapter 18).

(Continued)

Primary Examiner—William K Cheung

(57) ABSTRACT

Aqueous dispersions preparable using
(A) an organic compound selected from the group consisting of organosilicon compounds, polyurethanes and their precursor compounds such as polyols and polyisocyanates, crosslinked (poly)epoxides and their precursor compounds such as noncrosslinked and partly crosslinked (poly)epoxides, (poly)amines, (poly)amidoamines, (poly)mercaptans, (poly)carboxylic acids, (poly)carboxylic anhydrides, acrylates and their precursor compounds, and polysulfide-forming polymers,
(B) particles partially wettable with water,
(C) water and
further substances if desired.

23 Claims, 2 Drawing Sheets

OTHER PUBLICATIONS

Lagaly, G., et al., "Dispersionen und Emulsionen," 1997, pp. 1-4, corresponding to Dispersions and Emulsions—Introduction in the Colloid Science of Disposed Substances.

Schoelkopf, J., et al., "Measurement and Network Modeling of Liquid Permeation into Compacted Mineral Blocks," J. Colloid. and Interf. Sci.: 227, 2000, pp. 119-131.

Washburn, E., "The Dynamics of Capillary Flow," The American Physical Society, 2nd Series, pp. 374-375.

Sears, G.W., Jr., et al., "Determination of Specific Surface Area of Colloidal Silica by Titration with Sodium Hydroxide," Anal. Chem., vol. 28, No. 12, 1956, pp. 1981-1983.

Lucas, von R., "Ueber das Zeitgesetz des kapillaren Aufstiegs von Flüssigkeiten," 1918, pp. 15-22 corresponding to "Capillary Flow of Liquids".

H. Vedala, et al., "Surface Modification of Carbon Nanotubes Using Poly (Vinyl Alcohol) For Sensor Applications", Second LACCEI International Latin American and Caribbean Conference for Engineering and Technology (LACCEI '2004) "Challenges and Opportunities for Engineering Education, Research and Development", Jun. 2004, pp. 1-4.

"Elvanol® in Water-Based Adhesives," DuPont, The Miracles of Science, Copyright © 1995—2004 DuPont.

"Precipitation of Polyvinyl-Alcohol-Stabilized Emulsions", "BU Emulsions R & D informs", Clariant, Clariant GmbH, pp. 1-6.

* cited by examiner

AQUEOUS POLYMER DISPERSIONS

BACKGROUND OF THE INVENTION

1. Field of the Invention

The invention relates to aqueous dispersions of polymers which, following removal of water, can be converted into elastomers or resins, to processes for preparing them, and to their use as sealants, adhesives and coating materials.

2. Background Art

In order to protect the environment, chemical formulations should desirably contain no volatile organic constituents. Accordingly, the use of aqueous systems is continually on the increase.

Aqueous dispersions of polymers, especially those which following removal of water can be converted into elastomers or resins, are by now well known. They consist essentially of a linear polymer, an emulsifier and water. Also known is the addition of further substances such as crosslinkers, adhesion promoters, crosslinking catalysts and nonreinforcing fillers. Polymers used are those containing reactive end groups. Either the finished polymers can be processed directly to an emulsion, using water and emulsifier, or starting materials for the polymers are first emulsified, optionally followed, if desired, by an emulsion polymerization, for example, of the addition polymerization, polycondensation or polyaddition type, or by radiation crosslinking or thermal crosslinking. The polymer emulsion can then be mixed with a crosslinker component and catalysts, either as they are, or in the form of an emulsion, and with further constituents, such as fillers, adhesion promoters, etc.

Previously, aqueous dispersions of organopolysiloxanes generally have been stabilized by means of organic emulsifiers. Cationic, anionic, ampholytic and nonionic emulsifiers have been used. Publications which exemplify this include EP 365 439 A and EP 665 882 A.

U.S. Pat. No. 4,221,688 and U.S. Pat. No. 4,427,811 describe silicone polymer emulsions which cure to elastomers on removal of water, which are stabilized by anionic emulsifiers. These emulsions further comprise colloidal silica in order to enhance the mechanical properties. U.S. Pat. No. 5,162,429, moreover, describes silicone polymer compositions composed of a polymer emulsion stabilized with anionic emulsifiers and an aqueous pyrogenic silica dispersion stabilized with anionic emulsifiers. The pyrogenic silica is employed therein as a reinforcing filler.

The existing aqueous dispersions of polymers which can be converted into elastomers following removal of water generally have the disadvantage of providing poor adhesion to substrates, particularly when subject to moisture. This is attributed to the high emulsifier content, which is necessary in order to produce adequate storage stability.

Around 1910, Pickering was the first to prepare paraffin-water emulsions, which he stabilized only by adding various solids, such as basic copper sulfate, basic iron sulfate or other metal salts. This type of emulsion is also referred to as a "Pickering emulsion". Fundamental investigations have shown that one characteristic of Pickering emulsions is that particulate solids are sited at the interface between the two liquid phases, where they form a barrier which prevents the liquid droplets from coalescing.

SUMMARY OF THE INVENTION

The present invention provides aqueous dispersions preparable using at least one organic compound (A) selected from the group consisting of organosilicon compounds; polyurethanes and their precursor compounds such as polyols and polyisocyanates; crosslinked (poly)epoxides and their precursor compounds such as noncrosslinked and partially crosslinked (poly)epoxides; (poly)amines; (poly)amidoamines; (poly)mercaptans; (poly)carboxylic acids; and (poly) carboxylic anhydrides; acrylates and their precursor compounds; and polysulfide-forming polymers, (B) particles partially wettable with water,
(C) water, and
optionally further substances.

DETAILED DESCRIPTION OF THE PREFERRED EMBODIMENT(S)

Figure 1A:
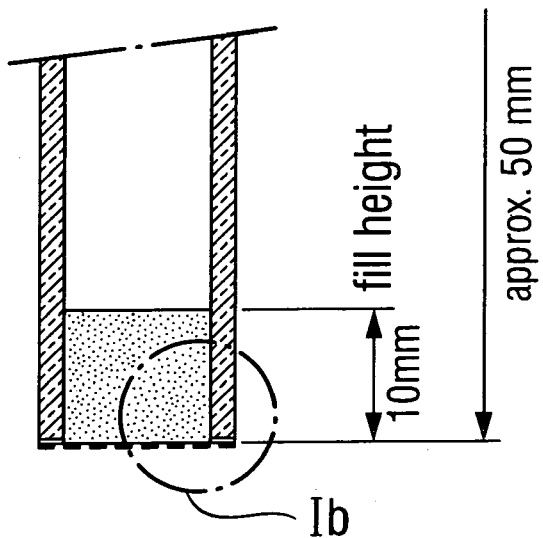
FIGS. 1a and 1b illustrate a measurement method for determining contact angle.

The dispersions of the invention are preferably substantially free from conventional, purely organic, surface-active substances which are solid or liquid and nonparticulate at room temperature under the pressure of the surrounding atmosphere. Examples include nonionic, cationic and anionic emulsifiers ("organic emulsifiers").

Nonparticulate emulsifiers thus are not particles or colloids, but rather molecules and polymers, in accordance with the definition of molecules, polymers, colloids and particles as given in DISPERSIONEN UND EMULSIONEN, G. Lagaly, O. Schulz, R. Zindel, Steinkopff, Darmstadt 1997, ISBN 3-7985-1087-3, pp. 1-4. Generally speaking, these organic emulsifiers have a size of less than 1 nm, a molar mass of less than 10,000 g/mol, a carbon content greater than 50% by weight as determinable by elemental analysis, and a Mohs hardness of less than 1. At the same time the emulsifiers from which the dispersions of the invention are substantially free generally have a solubility in water at 20° C. under the pressure of the surrounding atmosphere, i.e., 900 to 1100 hPa, homogeneously or in micellar form, of greater than 1% by weight.

The dispersions of the invention can contain such organic emulsifiers up to a maximum concentration of less than 0.1 times, preferably less than 0.01 times, more preferably less than 0.001 times and in particular less than 0.0001 times the critical micelle concentration of these surface-active substances in the aqueous phase, corresponding to a concentration of these surface-active substances, based on the total weight of the dispersion of the invention, of less than 10% by weight, preferably less than 2% by weight, more preferably less than 1% by weight and in particular, 0% by weight.

Component (A) may comprise all monomeric, oligomeric and polymeric compounds which it has been possible to disperse to date, and these compounds can be linear, branched or cyclic. Component (A) may comprise reactive compounds, which following removal of the water can be converted into elastomers and/or resins, or nonreactive compounds, which following removal of water are unchanged.

Examples of component (A) include organosilicon compounds such as organo(poly)silanes, organo(poly)siloxanes, organo(poly)silazanes and organo(poly)silcarbanes; polyolefins such as silyl-terminated polyisobutylenes (e.g., available under the brand name Epion from Kaneka Corp., Japan); polyurethanes; polyols such as hydroxyl-containing polyesters, hydroxyl-containing polyethers, methyldimethoxysilyl-propyl-terminated polypropylene glycols (e.g., available as "MS Polymers" from Kaneka Corp. Japan), and hydroxy-containing polyacrylates; polyisocyanates such as aliphatic and aromatic polyisocyanates, isocyanate-terminated polyurethane prepolymers prepared by reacting polyols with polyisocyanates in excess, and also the silyl-terminated derivatives thereof (e.g., available under the name DESMOSEAL® from Bayer AG, Germany); (poly)epoxy compounds such as bisphenol-A-based epoxides, monomeric, oligomeric and polymeric compounds containing glycidyloxy functions, such as diglycidyl ethers based on bisphenol A, epoxy-novolac base materials and resins, epoxy alkyd resins, epoxy acrylates, aliphatic epoxies such as linear alkylene bisglycidyl ethers and cycloaliphatic glycidyl ethers such as 3,4-epoxycyclohexyl 3,4-epoxycyclohexanecarboxylates, and aromatic epoxies such as triglycidyl ether of p-aminophenol and triglycidyl ether of methylenedianiline; (poly)amines such as cyclic and linear amines for example hexamethylenediamine, aromatic amines such as 4,4'-methylenebis(2,6-diethylaniline), bis(2-aminoalkyl)-polyalkylene oxide such as bis(2-aminopropyl)-polypropylene glycol and Jeffamines™; (poly)amidoamines; (poly)mercaptans; (poly)carboxylic acid; (poly)carboxylic anhydrides; acrylates and their esters such as glycidyl acrylates; alkyl acrylates and their esters; methacrylates and their esters; polysulfide-forming polymers and polysulfides such as thioplastics (e.g., available under the brand name Thiokol from Toray Thiokol Co. Ltd.).

Examples of epoxy compounds are alkylene bisglycidyl ethers, such as

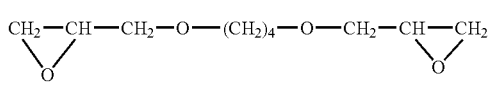

bisphenol-A-based diglycidyl ethers, such as bifunctional epoxy compounds, such as

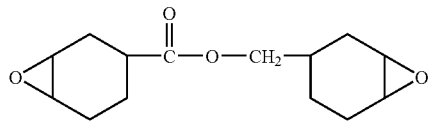

trifunctional epoxy compounds, such as

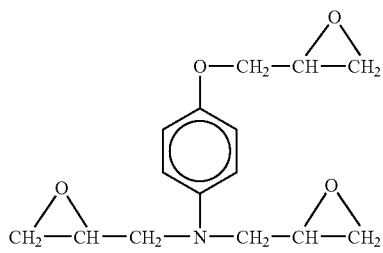

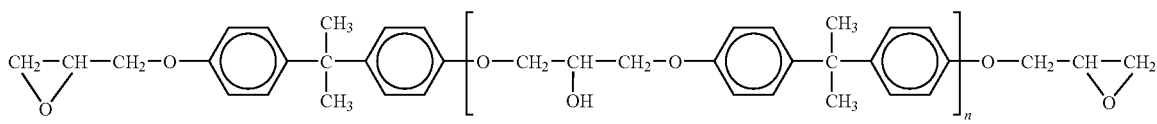

with n preferably from 0 to 10, more preferably from 0 to 5.

Examples of epoxy-novolac resins include those of the formula

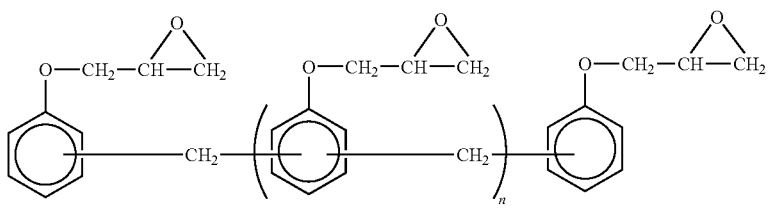

tetrafunctional epoxy compounds, such as

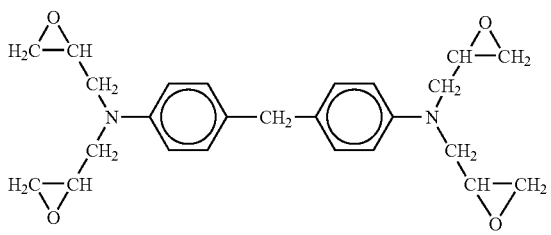

The component (A) used for preparing the dispersions of the invention is solid or liquid at room temperature under the pressure of the surrounding atmosphere, i.e., between 900 and 1100 hPa.

If the component (A) used in accordance with the invention is liquid, it preferably has a viscosity of from 1 to 10,000,000 mm$^2$/s, more preferably from 100 to 500,000 mm$^2$/s, and with particular preference from 1000 to 350,000 mm$^2$/s, in each case at 25° C.

Preferably component (A) comprises organosilicon compounds, more preferably those comprising units of the formula $$R_a(OR^1)_b X_c SiO_{(4-a-b-c)/2} \quad (I),$$

where
R are identical or different SiC-bonded hydrocarbon radicals having 1 to 18 carbon atoms, unsubstituted or substituted by halogen atoms, amino groups, ether groups, ester groups, epoxy groups, mercapto groups, cyano groups or (poly)glycol radicals, the latter preferably being composed of oxyethylene and/or oxypropylene units,
$R^1$ are identical or different and denote hydrogen atom or unsubstituted or substituted hydrocarbon radicals which can be interrupted by oxygen atoms,
X are identical or different and denote halogen atom, pseudohalogen radicals, Si—N-bonded amine radicals, amide radicals, oxime radicals, aminoxy radicals and acyloxy radicals,
a is 0, 1, 2 or 3, preferably 1 or 2,
b is 0, 1, 2 or 3, preferably 0, 1 or 2, and
c is 0, 1, 2 or 3, preferably 0 or 1, more preferably 0, with the proviso that the sum of a+b+c is less than or equal to 4.

The organosilicon compounds used as component (A) may comprise not only silanes, i.e., compounds of the formula (I) with a+b+c=4, but also siloxanes, i.e., compounds comprising units of the formula (I) with a+b+c≦3. The organosilicon compounds comprising units of the formula (I) are preferably organopolysiloxanes, especially those composed of units of the formula (I).

Examples of hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; alkenyl radicals such as the vinyl and the allyl radical; cycloalkyl radicals such as cyclopentyl, cyclohexyl, cycloheptyl radicals and methylcyclohexyl radicals; aryl radicals such as the phenyl, naphthyl, anthryl and phenanthryl radicals; alkaryl radicals such as the o-, m-, p-tolyl radicals, xylyl radicals and ethylphenyl radicals; and aralkyl radicals, such as the benzyl radical, and the alpha- and the beta-phenylethyl radicals.

Examples of substituted hydrocarbon radicals R are halogenated radicals such as the 3-chloropropyl radical, the 3,3,3-trifluoropropyl radical, chlorophenyl radicals, hexafluoropropyl radicals such as the 1-trifluoromethyl-2,2,2-trifluoroethyl radical; the 2-(perfluorohexyl)ethyl radical, the 1,1,2,2-tetrafluoroethyloxypropyl radical, the 1-trifluoromethyl-2,2,2-trifluoroethyloxypropyl radical, the perfluoroisopropyloxyethyl radical, the perfluoroisopropyloxypropyl radical; radicals substituted by amino groups such as the N-(2-aminoethyl)-3-aminopropyl radical, the 3-aminopropyl radical, the 3-(cyclohexylamino)propyl radical, the aminomethyl radical, the cyclohexylaminomethyl radical and the diethylaminomethyl radical; ether-functional radicals such as the 3-methoxypropyl radical, the methoxymethyl radical, the 3-ethoxypropyl radical and the acetoxymethyl radical; cyano-functional radicals such as the 2-cyanoethyl radical; ester-functional radicals such as the methacryloyloxypropyl radical; epoxy-functional radicals such as the glycidoxypropyl radical; and sulfur-functional radicals such as the 3-mercaptopropyl radical.

Preferred radicals R are hydrocarbon radicals having 1 to 10 carbon atoms, and with particular preference, at least 80%, in particular at least 90%, of the radicals R are methyl radicals.

Examples of radicals $R^1$ are the examples stated for radical R. Preferred radicals $R^1$ are the hydrogen atom and alkyl groups having 1 to 6 carbon atoms, more preferably the hydrogen atom and methyl and also ethyl radicals, and in particular, the hydrogen atom.

Examples of X are halogen atoms such as chlorine atoms, bromine atoms, pseudohalides, such as —CN and —OCN, amine radicals such as the diethylamino and cyclohexylamino radicals, amide radicals such as N-methylacetamido and benzamido radicals, aminoxy radicals such as diethylaminoxy radical, and acyloxy radicals such as the acetoxy radical, preference being given to chlorine atoms.

Component (A) comprises substances which are commercially customary and/or can be prepared by methods commonplace in organic or organosilicon chemistry.

Component (B) comprises partly water-wettable particles, i.e., particles which are not completely wettable with water and not completely water-unwettable, which are solid at room temperature under the pressure of the surrounding atmosphere, i.e., between 900 and 1100 hPa.

The particles of component (B) preferably have a solubility in water at pH 7.33, an electrolyte background of 0.11 mol, and a temperature of 37° C., of less than 0.1 g/l, more preferably less than 0.05 g/l, under the pressure of the surrounding atmosphere, i.e., between 900 and 1100 hPa.

Preferably the particles (B) used in accordance with the invention have an average diameter of more than 1 nm, preferably from 1 to 5000 nm, more preferably from 10 to 1000 nm, in particular from 100 to 600 nm and especially from 200 nm to 500 nm, measured in each case preferably by means of dynamic light scattering. Preferably the particles (B) have a molar mass of more than 10,000 g/mol, more preferably a molar mass of from 50,000 to 50,000,000 g/mol, in particular from 100,000 to 10,000,000 g/mol, measured in each case preferably by means of static light scattering.

Preferably the particles (B) have a specific BET surface area of from 30 to 500 m$^2$/g, more preferably from 100 to 300 m$^2$/g. The BET surface area is measured by known methods, preferably in accordance with German Industrial Standards DIN 66131 and DIN 66132. The particles (B) preferably have a carbon content of less than 50 percent by weight, and have a Mohs hardness preferably greater than 1, more preferably greater than 4.

Component (B) preferably comprises particles having a contact angle THETA of from 0 to 180°, more preferably from 30 to 150°, and in particular from 45 to 135°, measured in each case at the water-air phase boundary at a temperature of 25° C. under the pressure of the surrounding atmosphere, i.e., between 900 and 1100 hPa, and a surface energy gamma of from 30 to 72.5 mJ/m$^2$ at a temperature of 25° C. under the pressure of the surrounding atmosphere, i.e., between 900 and 1100 hPa.

The particles (B) used in accordance with the invention preferably have a dispersion component of the surface energy, gamma-s-D, of from 40 to 80 mJ/m$^2$, preferably from 50 to 70 mJ/m$^2$, more preferably from 60 to 70 mJ/m$^2$, at a temperature of 25° C. under the pressure of the surrounding atmosphere, i.e., between 900 and 1100 hPa. The dispersion component of the surface energy, gamma-s-D, is measured for example as in "Inverse Gas Chromatography"—"Characterization of Polymers and other Materials", 391 ACS Symposium Series, D R Lloyd, Th C Ward, H P Schreiber, Chapter 18, pp 248-261, ACS, Washington D.C. 1989, ISBN 0-8412-1610-X.

Examples of component (B) used in accordance with the invention include silicates, aluminates, titanates, aluminum phyllosilicates such as bentonites, montmorillonites, smectites and hectorites; metal oxides such as oxides of silicon, aluminum, titanium, nickel, cobalt, iron, manganese, chromium and vanadium; carbon blacks such as lamp blacks and furnace blacks; and nitrides and carbides such as boron nitride, boron carbide, silicon nitride and silicon carbide, with the proviso that they are partly wettable with water.

Component (B) preferably comprises inorganic, partly water-wettable oxides, especially metal oxides having a covalent bonding component in the metal-oxygen bond, such as, for example, solid oxides of the main and transition group elements, such as of main group 3, for example boron oxide, aluminum oxide, gallium oxide and indium oxide; of main group 4, for example silicon dioxide, germanium dioxide, tin oxide, tin dioxide, lead oxide, and lead dioxide; and oxides of transition group 4, for example titanium dioxide, zirconium oxide and hafnium oxide.

The partly water-wettable metal oxides (B) used in accordance with the invention preferably comprise aluminum (III), titanium (IV) and silicon (IV) oxides, such as those prepared by wet-chemical methods, examples being precipitated silicas or silica gels, or elevated-temperature-process aluminum oxides, titanium dioxides or silicon dioxides, for example, pyrogenically prepared aluminum oxides, titanium dioxides or silicon dioxides or silicas, particular preference being given to partly water-wettable silica. For the purposes of the present invention the term "silica" and also "silicon dioxide" are to be considered as embraced by the generic term "metal oxide".

The preferred starting silica from which the partly water-wettable silica used in the dispersions of the invention is prepared, can be manufactured in any desired, conventional manner, for example, in a flame reaction from halogen-silicon compounds, e.g., from silicon tetrachloride, or halogen-organosilicon compounds such as methylchlorosilanes, particularly methyltrichlorosilane or hydrochlorosilanes such as hydrotrichlorosilane, or other hydromethylchlorosilanes such as hydromethyldichlorosilane, or from alkylchlorosilanes, alone or in a mixture with hydrocarbons, or any desired sprayable and, preferably volatilizable mixtures of organosilicon compounds, as mentioned, and hydrocarbons, it being possible for the flame to be a hydrogen-oxygen flame or else a carbon monoxide-oxygen flame. The silica can be prepared optionally with and without further addition of water, in the purification step for example. It is preferred not to add water.

The dispersions of the invention are preferably prepared using as component (B) partly hydrophobicized, with particular preference partially silylated, particulate solids, particularly those which carry OH groups on their surface. Partially silylated here denotes that neither the entire particle surface is unsilylated nor that the entire particle surface is silylated. The degree of coverage, τ, of the surface of the particulate solids with silylating agent radicals, based on the total particle surface area, is preferably from 5 to 95%, more preferably from 5 to 50%, and in particular from 10 to 30%.

The coverage with silylating agent can be determined, for example, by means of elemental analysis, for example by way of the carbon content, or by determining the residual amount of reactive surface OH groups of the particle.

For pyrogenic silicon dioxide partial silylation denotes here that the amount of non-silylated surface silanol groups on the silicon dioxide surface preferably varies between a maximum of 95% and a minimum of 5%, more preferably from 95% to 50%, in particular from 90% to 70%, of the silanol content of the initial silicon dioxide. This means that the density of surface silanol groups, SiOH, preferably varies between a minimum of 0.1 and a maximum of 1.7, more preferably from 0.9 to 1.7, and with particular preference from 1.25 to 1.6, expressed as SiOH groups per nm$^2$ of particle surface.

For a starting silicon dioxide with a specific surface area of 200 m$^2$/g employed for the silylation, this means preferably between a minimum of 0.03 mmol/g of SiOH and a maximum of 0.57 mmol/g of SiOH, more preferably from 0.3 to 0.57 mmol/g of SiOH, and with particular preference from 0.42 to 0.54 mmol/g of SiOH; for a silicon dioxide having a smaller or greater surface area, respectively, this denotes a greater or lesser quantity, in linear proportion, of surface silanol groups SiOH.

Methods of partially hydrophobicizing or partially silylating particulate solids are already known.

The starting silica preferably has a specific BET surface area of from 25 to 500 m$^2$/g. The starting silica preferably comprises aggregates (as defined in DIN 53206) in the diameter range from 100 to 1000 nm, the silica comprising agglomerates (as defined in DIN 53206) composed of aggregates and having sizes of from 1 to 500 μm depending on the external shear load (e.g., upon the measuring conditions).

The starting silica preferably has a fractal surface dimension of less than or equal to 2.3, the fractal surface dimension $D_s$ being defined as follows: particle surface area A is proportional to particle radius R to the power of $D_s$. The starting silica preferably has an available (available, that is, for a chemical reaction) surface silanol group (SiOH) density of from 1.5 to 2.5 SiOH per nm$^2$ of specific surface area, more preferably from 1.6 to 2.0 SiOH per nm$^2$.

The starting silicas used to prepare component (B) can be silicas prepared at high temperature (greater than 1000° C.), particular preference being given to pyrogenically prepared silicas. It is possible to use hydrophilic silicas which come freshly produced direct from the burner, have been stored following preparation, or are already in commercially customary packaged form.

As starting silicas it is possible to use uncompacted silicas, with tamped or tapped densities of less than 60 g/l, and also compacted silicas, with tamped or tapped densities greater than 60 g/l. Mixtures of different silicas can be used as starting silicas, such as, for example, mixtures of silicas differing in BET surface area.

For silylating particulate solids it is preferable to use organosilicon compounds, such as, for example, (i) organosilanes or organosilazanes of the formula

$$R^2_d SiY_{4-d} \quad (II)$$

and/or their partial hydrolysates, where $R^2$ each are identical or different and denote a monovalent, unsubstituted or substituted hydrocarbon radical which has 1 to 24 carbon atoms optionally interrupted by oxygen atoms, d is 1, 2 or 3 and Y each are identical or different and denote halogen atoms, monovalent Si—N-bonded nitrogen radicals to which a further silyl radical may be attached, —OR³ or —OC(O)OR³, R³ denoting hydrogen atom(s) or monovalent, unsubstituted or substituted hydrocarbon radical(s) which may be interrupted by oxygen atoms, or (ii) linear, branched or cyclic organosiloxanes composed of units of the formula

$$R^4_e(OR^5)_f SiO_{(4-e-f)/2} \quad (III),$$

where $R^4$ each are identical or different and is defined as stated above for $R^2$, $R^5$ each are identical or different and is defined as stated for $R^1$, e is 0, 1, 2 or 3 and f is 0, 1, 2 or 3, with the proviso that the sum e+f is ≦3, or mixtures of (i) and (ii).

The organosilicon compounds which can be used for silylating the particulate solids may comprise, for example, mixtures of silanes or silazanes of the formula (II), preference being given on the one hand to those comprising methylchlorosilanes or alkoxysilanes and, if desired, disilazanes on the other hand.

Examples of $R^2$ are the radicals stated above for R, preferably methyl, octyl and vinyl radicals, more preferably the methyl radical. Examples of $R^3$ are the radicals stated above for R, preferably the methyl and ethyl radicals.

Examples of organosilanes of the formula (I) are alkylchlorosilanes such as methyltrichlorosilane, dimethyldichlorosilane, trimethylchlorosilane, octylmethyldichlorosilane, octyltrichlorosilane, octadecylmethyldichlorosilane and octadecyltrichlorosilane; methylmethoxysilanes such as methyltrimethoxysilane, dimethyldimethoxysilane and trimethylmethoxysilane; methylethoxysilanes such as methyltriethoxysilane, dimethyldiethoxysilane and trimethylethoxysilane; methylacetoxysilanes such as methyltriacetoxysilane, dimethyldiacetoxysilane and trimethylacetoxysilane; vinylsilanes such as vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane and vinyldimethylethoxysilane; disilazanes such as hexamethyldisilazane, divinyltetramethyldisilazane and bis(3,3,3-trifluoropropyl)tetramethyldisilazane; cyclosilazanes such as octamethylcyclotetrasilazane; and silanols such as trimethylsilanol. Preference is given to methyltrichlorosilane, dimethyldichlorosilane and trimethylchlorosilane or hexamethyldisilazane.

Examples of organosiloxanes of the formula (III) are linear or cyclic dialkylsiloxanes having an average number of dialkylsiloxy units greater than 3. The dialkylsiloxanes are preferably dimethylsiloxanes. Particular preference is given to linear polydimethylsiloxanes containing the following end groups: trimethylsiloxy, dimethylhydroxysiloxy, dimethylchlorosiloxy, methyldichlorosiloxy, dimethylmethoxysiloxy, methyldimethoxysiloxy, dimethylethoxysiloxy, methyldiethoxysiloxy, dimethylacetoxysiloxy, methyldiacetoxysiloxy and dimethylhydroxysiloxy groups, in particular to those containing trimethylsiloxy or dimethylhydroxysiloxy end groups. Preferably, the polydimethylsiloxanes have a viscosity at 25° C. of from 2 to 100 mPas.

Further examples of organosiloxanes are silicone resins, particularly those containing, as alkyl groups, methyl groups, more preferably those containing $R^4_3 SiO_{1/2}$ and $SiO_{4/2}$ units or those containing $R^4 SiO_{3/2}$ and optionally $R^4_2 SiO_{2/2}$ units, $R^4$ having one of the definitions specified above. The preferred silicone resins comprising units of the formula (III) preferably have a viscosity at 25° C. of from 500 to 5000 mm²/s.

Preferred silicone resins among those having a viscosity of more than 1000 mm²/s at 25° C. are those which can be dissolved in a solvent which is readily manageable industrially, preferably, alcohols such as methanol, ethanol, and isopropanol, ethers such as diethyl ether and tetrahydrofuran, siloxanes such as hexamethyldisiloxane, alkanes such as cyclohexane or n-octane, or aromatics such as toluene or xylene, with a concentration more than 10% by weight and a mixture viscosity less than 1000 mm²/s, at a temperature of 25° C. under the pressure of the surrounding atmosphere.

Among the solid organosiloxanes preference is given to those which dissolve in a solvent which can be managed industrially (as defined above) with a concentration greater then 10% by weight and a mixed viscosity less than 1000 mm²/s at a temperature of 25° C.

The substances used for preparing the component (B) used in accordance with the invention may each comprise a single variety or else a mixture of at least two varieties of such substances.

A preferred process for preparing component (B) of the invention will be described below with reference to the preferred starting product, silica, particular preference being given to the use of pyrogenic silicas.

The hydrophobicization-cum-silylation which is carried out with preference for preparing the component (B) used in accordance with the invention can be carried out as a discontinuous reaction, i.e., batchwise, or as a continuous reaction, the continuous reaction being preferred, and can be attained in one step or in 2 or 3 successive steps. In other words, the reaction may be preceded by a loading operation (physisorption of the silylating agent) and followed preferably by a purification step. There are preferably 3 successive steps: (1) loading, (2) reaction, and (3) purification. The loading temperature is preferably −30 to 350° C., more preferably 20 to 120° C., and the reaction temperatures range is preferably from 50 to 400° C., more preferably from 50 to 330° C. The reaction times preferably last from 1 minute to 24 hours, more preferably 30 minutes to 4 hours. The reaction pressure is preferably in the atmospheric pressure range, i.e., between 900 and 1100 hPa. The purification temperature ranges preferably from 100 to 400° C.

Effective agitation and comixing of silica and silylating agent during steps (1) loading, (2) reaction and (3) purification are necessary, and may be effected preferably by means of mechanical or gasborne fluidization. Gasborne fluidization may take place by means of all inert gases which do not lead to secondary reactions, degradation reactions, oxidation events or flame and explosion phenomena. The superficial gas velocity is preferably from 0.05 to 5 cm/s, more preferably from 0.05 to 1 cm/s. Mechanical fluidization may take place by means of paddle stirrers, anchor stirrers and other suitable stirring elements.

The reaction is preferably conducted in an atmosphere which does not lead to oxidation of the silylated silica, i.e., preferably less than 10% by volume oxygen, more preferably less than 2.5% by volume, the best results being achieved with less than 1% by volume oxygen. In one particularly preferred embodiment, the amount of gas supplied is only that sufficient to maintain a low-oxygen atmosphere, preferably less than 5% by volume; in that case, fluidization may take place by mechanical means alone.

The silylating agents are incorporated effectively into the silica. Where the silylating agents are compounds which are liquid at application temperature, it is preferred to employ effective nozzle spraying techniques, for example spraying in 1-fluid nozzles under pressure (5 to 20 bar), spraying in 2-fluid nozzles under pressure (gas and liquid 2 to 20 bar), ultrafine division using atomizers, etc. The silylating agent is preferably added in the form of an ultrafinely divided aerosol, the aerosol preferably having a settling velocity of preferably from 0.1 to 20 cm/s and a droplet size with an aerodynamic equivalent diameter of from 5 to 25 μm.

Optionally it is possible to add protic solvents such as liquid or vaporizable alcohols or water. Typical alcohols are isopropanol, ethanol and methanol. It is also possible to add mixtures of the abovementioned protic solvents. Preferably no protic solvents are added.

Optionally it is also possible to add acidic or basic catalysts. These catalysts may be basic in nature, in the sense of a Lewis base or a Brönsted base such as ammonia, or acidic in nature, in the sense of a Lewis acid or a Brönsted acid such as hydrogen chloride. If catalysts are used the amounts involved are preferably traces, i.e., less than 1000 ppm. With particular preference, no catalysts are used.

The purification step is characterized by agitation, with preference being given to slow agitation and a low level of mixing, and is further characterized by increased gas input, corresponding to a superficial gas velocity of from 0.001 to 10 cm/s. The purification step may further comprise a mixing operation with mechanical stirring elements. The stirring elements are in such a case preferably configured and moved so that mixing and fluidization, but not complete vortexing, occur.

Additionally it is possible during the silylating step to use methods of mechanical compaction, such as press rolls, ball mills, edge runner mills, worm compactors and briquetting machines.

In addition, it is possible, before, during or after the silylating step, to employ methods of deagglomerating the silica, such as pinned-disk mills or apparatus for grinding/classifying and/or methods of mechanical compaction of the silica, such as press rolls, for example, or compaction by withdrawal of the air or gas present by means of suitable vacuum methods, or to employ other methods of mechanical compaction, for example, press rolls, ball mills, edge runner mills, worm compactors and briquetting machines.

The silicas used as component (B) in accordance with the invention preferably have a BET surface area of from 170 to 230 m²/g and a carbon content of from 0.1 to 3 percent by weight, preferably from 0.1 to 1.5 percent by weight, in particular from 0.1 to 1 percent by weight and very preferably from 0.1 to 0.7 percent by weight, in each case preferably determinable by means of elemental analysis.

The component (B) used in accordance with the invention can also be prepared in situ during the preparation of the dispersions of the invention.

The dispersions of the invention comprise component (B) in amounts of preferably from 0.1 to 50 parts by weight, more preferably from 1 to 15 parts by weight and in particular from 2 to 10 parts by weight, based on 100 parts by weight of total dispersion.

The further substances, used if desired, comprise any desired substances which have also been used to date in aqueous dispersions, such as fillers, crosslinking catalysts, pigments, fungicides, rheological assistants, crosslinkers and catalysts, for example.

The components used in accordance with the invention may in each case comprise a single kind or else a mixture of at least two kinds of such components. The dispersions of the invention preferably have a solids content of from 50 to 99.9% by weight, more preferably from 70 to 95% by weight, and in particular from 80 to 95% by weight.

The aqueous dispersions of the invention are preferably dispersions preparable using the following starting materials:
(A) organosilicon compounds comprising units of the formula (I),
(B) particles which are partly wettable with water,
(C) water,
(D) optionally, compounds containing basic nitrogen,
(E) optionally, fillers,
(F) optionally, crosslinking catalysts, and
(G) optionally, additives, such as pigments, fungicides, rheological assistants and catalysts.

The component (A) used in accordance with the invention preferably comprises (A1) organopolysiloxane(s) containing condensable groups, preferably in a mixture with (A2) organopolysiloxane resin(s), optionally containing condensable groups, or organosilane(s) containing condensable groups, and/or the partial hydrolysates thereof. For the purposes of the present invention the term "condensable" is also intended to include hydrolysis in advance if desired.

The organopolysiloxanes (A1) used in accordance with the invention and containing condensable groups are preferably those comprising units of the formula (I), with the proviso that the sum of a+b+c≦3 and per molecule there is at least one unit present with b being other than 0 and $R^1$ being a hydrogen atom, more preferably those of the formula $$HO-[SiR_2O]_n-H \qquad (IV),$$

in which
R are each identical or different and have one of the abovementioned definitions, and
n is an integer of at least 10, preferably at least 30, and more preferably at least 100.

The organopolysiloxanes (A1) used in accordance with the invention are preferably α,ω-dihydroxypolydimethylsiloxanes.

The average value for the number n in formula (IV) is preferably selected such that the organopolysiloxane (A1) of the formula (IV) possesses a viscosity of from 10 to 250,000 mPas, more preferably from 1000 to 100,000 mPas, in each case at 25° C.

Although not indicated in formula (IV) it is possible for up to 10 mol percent of the diorganosiloxane units to be replaced by other siloxane units, which, however, are usually present only in the form of more or less difficulty avoidable impurities, such as $R_3SiO_{1/2}$, $RSiO_{3/2}$ and $SiO_{4/2}$, R having the definition indicated therefor above.

The polydiorganosiloxanes of formula (IV) are commercial products or can be prepared by methods known in the art: for example, by addition polymerization or condensation of low molecular mass cyclic or linear, hydroxy- and/or alkoxy-end blocked organopolysiloxanes.

The organopolysiloxane resin (A2) used in accordance with the invention preferably comprises resins composed of units of the general formula

$$(R^1O)_gR_hSiO_{(4-g-h)/2} \qquad (V),$$

where

R and $R^1$ independently of one another are identical or different and have one of the definitions stated above, h is 0, 1, 2 or 3 and g is 0, 1, 2 or 3, with the proviso that the sum of g+h is less than or equal to 3.

The organopolysiloxane resin (A2) used in accordance with the invention is preferably one having a molecular weight $M_w$ of from 500 to 100,000, preferably from 1000 to 20,000, and a viscosity of from 10 to 10,000,000 mm²/s, more preferably from 1000 to 1,000,000 mm²/s, and with particular preference from 10,000 to 500,000 mm²/s, at 25° C.

Although not expressed by the formula (V), the organopolysiloxane resin, owing to its preparation, may contain up to 10 percent by weight of Si-bonded chlorine atoms.

The organopolysiloxane resin (A2) used in accordance with the invention are available commercially, or can be prepared by conventional methods such as by condensation of low molecular mass organopolysiloxane resins in dispersion, for example the low molecular mass organopolysiloxane resins being preparable by solvolysis and condensation of a solution of the corresponding silanes containing Si-bonded chlorine atoms in a water-immiscible solvent by means of an alcohol/water mixture.

Instead of the organopolysiloxane resin used as component (A2) it is also possible to employ organosilane containing condensable groups and/or its partial hydrolysates. Examples of such organosilanes are all organosilanes which are useful in condensation-crosslinking organopolysiloxane materials, such as alkoxysilanes, acetoxysilanes and oximosilanes, for instance.

The aqueous dispersions of organopolysiloxanes of the invention are prepared using organopolysiloxane resin (A2) in amounts of preferably from 0.1 to 100 parts by weight, more preferably from 0.5 to 35 parts by weight, in particular from 2 to 20 parts by weight, based in each case on 100 parts by weight of organopolysiloxane (A1) containing condensable groups.

The compounds (D) that contain basic nitrogen and are optionally used in accordance with the invention are preferably compounds selected from the group consisting of compounds of the formula

$$NR^6_3 \qquad (VI),$$

where $R^6$ each are identical or different and denote a hydrogen atom or a hydrocarbon radical, which are unsubstituted or substituted by hydroxyl groups, halogen atoms, amino groups, ether groups, ester groups, epoxy groups, mercapto groups, cyano groups or (poly)glycol radicals, the latter being composed of oxyethylene and/or oxypropylene units, with the proviso that in formula (VI) not more than two radicals $R^6$ are hydrogen atoms; aliphatic cyclic amines such as piperidine and morpholine, and organosilicon compounds having at least one organic radical containing basic nitrogen and composed of units of the formula

$$R^7_kA_lSi(OR^8)_mO_{(4-k-l-m)/2} \qquad (VII),$$

in which $R^7$ each are identical or different and denote monovalent, SiC-bonded organic radicals which are free from basic nitrogen, $R^8$ each are identical or different and denote a hydrogen atom, an alkyl radical, alkali metal cation, ammonium or phosphonium group, A each are identical or different and denote a monovalent, SiC-bonded radical containing basic nitrogen, k is 0, 1, 2, or 3, l is 0, 1, 2, 3 or 4 and m is 0, 1, 2 or 3, with the proviso that the sum of k+l+m is less than or equal to 4 and per molecule there is at least one radical A present.

The unsubstituted or substituted hydrocarbon radicals $R^6$ are preferably those containing 1 to 18 carbon atoms. Radical $R^7$ preferably comprises a hydrocarbon radical having 1 to 18 carbon atoms, the methyl, ethyl and propyl radical being particularly preferred, and in particular the methyl radical. Examples of radical $R^6$ and $R^7$ are, in each case independently of one another, the examples specified for R of unsubstituted or substituted hydrocarbon radicals.

Examples of radical $R^8$ are the hydrocarbon radicals specified for radical R, the cations of the alkali metals, such as those of lithium, sodium, potassium, rubidium and cesium, and also radicals of the formula

$$^+NR^9_4 \qquad (VIII)$$

or

$$^+PR^9_4 \qquad (IX),$$

where $R^9$ are identical or different and denote hydrocarbon radicals having 1 to 6 carbon atoms. Preferably radical $R^8$ is a hydrogen atom, methyl radical, ethyl radical or alkali metal cation, particular preference being given to the hydrogen atom, the methyl radical, the ethyl radical, and sodium and potassium cations.

Preferably the radicals A are those of the formula

$$R^{10}_2NR^{11}— \qquad (X),$$

in which $R^{10}$ are identical or different and denote hydrogen, alkyl, cycloalkyl or aminoalkyl radicals and $R^{11}$ denotes a divalent hydrocarbon radical. The examples of alkyl and cycloalkyl radicals R also apply fully to alkyl and cycloalkyl radicals $R^{10}$. Preferably there is at least one hydrogen atom attached to each nitrogen atom in the radicals of the formula (X).

Radical $R^{11}$ preferably comprises divalent hydrocarbon radicals having 1 to 10 carbon atoms, more preferably 1 to 4 carbon atoms, in particular the n-propylene radical. Examples of radical $R^{11}$ are the methylene, ethylene, propylene, butylene, cyclohexylene, octadecylene, phenylene and butenylene radicals.

Examples of radicals A are $H_2N(CH_2)_3—$, $H_2N(CH_2)_2NH(CH_2)_2—$, $H_2N(CH_2)_2NH(CH_2)_3—$, $H_2N(CH_2)_2—$, $H_3CNH(CH_2)_3—$, $C_2H_5NH(CH_2)_3—$, $H_3CNH(CH_2)_2—$, $C_2H_5NH(CH_2)_2—$, $H_2N(CH_2)_4—$, $H_2N(CH_2)_5—$, $H(NHCH_2CH_2)_3—$, $C_4H_9NH(CH_2)_2NH(CH_2)_2—$, cyclo-$C_6H_{11}NH(CH_2)_3—$, cyclo-$C_6H_{11}NH(CH_2)_2—$, $(CH_3)_2N(CH_2)_3—$, $(CH_3)_2N(CH_2)_2—$, $(C_2H_5)_2N(CH_2)_3—$ and $(C_2H_5)_2N$ $(CH_2)_2$—. A preferably comprises $H_2N(CH_2)_3$—, $H_2N(CH_2)_2NH(CH_2)_3$—, $H_3CNH(CH_2)_3$—, $C_2H_5NH(CH_2)_3$— and cyclo-$C_6H_{11}NH(CH_2)_3$— radical, particular preference being given to $H_2N(CH_2)_2NH(CH_2)_3$— and cyclo-$C_6H_{11}NH(CH_2)_3$— radicals.

Where the organosilicon compounds comprising units of the formula (VII) are silanes, k is preferably 0, 1 or 2, more preferably 0 or 1, l is preferably 1 or 2, more preferably 1, and m is preferably 1, 2 or 3, more preferably 2 or 3, with the proviso that the sum of k+l+m is 4.

Examples of the silanes of the formula (VII) which are optionally used in accordance with the invention include $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_3$—$Si(OH)_{3-x}(OM)_x$, $H_2N(CH_2)_3$—$Si(OH)_{2-y}(OM)_yCH_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2NH(CH_2)_3$—$Si(OH)_{3-x}(OM)_x$, $H_2N(CH_2)_2NH(CH_2)_3$—$Si(OH)_{2-y}(OM)_yCH_3$, cyclo-$C_6H_{11}NH(CH_2)_3$—$Si(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_{3-x}(OM)_x$ and cyclo-$C_6H_{11}NH(CH_2)_3$—$Si(OH)_{2-y}(OM)_yCH_3$, preference being given to $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2NH(CH_2)_3$—$Si(OH)_{3-x}(ONa)_x$, $H_2N(CH_2)_2NH(CH_2)_3$—$Si(OH)_{2-y}(ONa)_yCH_3$, cyclo-$C_6H_{11}NH(CH_2)_3$—$Si(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_{3-x}(ONa)_x$ and also cyclo-$C_6H_{11}NH(CH_2)_3$—$Si(OH)_{2-y}(ONa)_yCH_3$ and particular preference being given to $H_2N(CH_2)_2NH(CH_2)_3$—$Si(OCH_3)_3$, $H_2N(CH_2)_2NH(CH_2)_3$—$Si(OCH_3)_2CH_3$, cyclo-$C_6H_{11}NH(CH)_3$—$Si(OCH_3)_3$, cyclo-$C_6H_{11}NH(CH_2)_3$—$Si(OCH_3)_2CH_3$, $H_2N(CH_2)_2NH(CH_2)_3$—$Si(OH)_{3-x}(ONa)_x$ and $H_2N(CH_2)_2NH(CH_2)_3$—$Si(OH)_{2-y}(ONa)_yCH_3$, where x is 0, 1, 2 or 3, y is 0, 1 or 2 and M is the cation of sodium or of potassium. Silanes of the formula (VII) are commercial products or can be prepared by methods commonplace in silicon chemistry.

Where the organosilicon compound comprising units of the formula (VII) comprises organopolysiloxanes, the average value of k is preferably between 0.5 and 2.5, more preferably between 1.4 and 2.0, the average value of l is preferably between 0.01 and 1.0, more preferably between 0.01 and 0.6, and the average value of m is preferably between 0 and 2.0, more preferably between 0 and 0.2, with the proviso that the sum of k, l and m is less than or equal to 3.

The organopolysiloxanes comprising units of the formula (VII) that are used if desired in accordance with the invention have a viscosity at 25° C. of preferably from 5 to $10^5$ mPas, more preferably from 10 to $10^4$ mPas.

Examples of the organopolysiloxanes comprising units of the formula (VII) are the organopolysiloxanes disclosed in DE 43 40 400 A1 (Wacker-Chemie GmbH; publication date: Jun. 1, 1995) on page 6, lines 15 to 51, which are incorporated herein by reference. Organopolysiloxanes comprising units of the formula (VII) are commercial products and/or can be prepared by methods commonplace in silicon chemistry.

Examples of amines of the formula (VI) are cyclohexylamine, triethylamine, dodecylamine, diethyl-n-propylamine, cyclohexylmethylamine, 2-aminoethanol, 2-amino-n-propanol, 2-amino-2-methyl-1-propanol, 2-dimethylamino-2-methyl-1-propanol, N,N-diethylethanolamine, ethylenediamine, coconut fatty amine, coconut fatty methylamine, N,N-dimethylethanolamine, and aniline.

If component (D) is used it preferably comprises organosilicon compounds having at least one organic radical containing basic nitrogen and comprising units of the formula (VII), especially potassium N-(2-aminoethyl)-3-aminopropylmethylsiloxide and sodium N-(2-aminoethyl)-3-aminopropylmethylsiloxide.

In order to prepare the aqueous dispersions of organopolysiloxanes of the invention it is preferred to use component (D), with particular preference in an amount such that the basic nitrogen content is preferably from 0.01 to 5 parts by weight, more preferably from 0.01 to 1 part by weight, in particular from 0.04 to 0.5 part by weight, based in each case on 100 parts by weight of organosilicon compound (A).

Additionally, the aqueous dispersions of organopolysiloxanes of the invention may further comprise fillers (E). Examples of fillers (E) include nonreinforcing fillers, for example, fillers having a BET surface area of up to 50 $m^2/g$, such as quartz, diatomaceous earth, calcium silicate, zirconium silicate, zeolites, alumina, titanium oxide, iron oxide, zinc oxide, barium sulfate, calcium carbonate, gypsum, silicon nitride, silicon carbide, boron nitride, glass powder and polymer powder. As fillers it is also possible to use the particulate solids employed as component (B) and/or their precursor particles.

If fillers (E) are used, the amounts involved are preferably from 0.1 to 200 parts by weight, more preferably from 0.5 to 100 parts by weight, based in each case on 100 parts by weight of organosilicon compound (A). The amount of filler (E) used can be varied within wide ranges and is guided in particular by the respective intended use of the dispersions of the invention.

The aqueous dispersions of organopolysiloxanes of the invention may further comprise additives (F), preferably selected from the group consisting of adhesion promoters, plasticizers, foam preventatives, thixotropic agents, dispersants, pigments, soluble dyes, fungicides, catalysts, odorants, and organic solvents which are inert in respect of the dispersions.

Examples of adhesion promoters, which are added in order to improve the adhesion of the elastomeric products, obtained after the solvent fractions of the aqueous dispersions of the invention have been removed, to the substrate to which the dispersions of the invention have been applied, include amino-functional silanes such as N-(2-aminoethyl)-3-aminopropyltrialkoxysilanes, in which the alkoxy radical is a methoxy, ethoxy, n-propoxy or isopropoxy radical.

Examples of plasticizers include dimethylpolysiloxanes which are end blocked by trimethylsiloxy groups, are liquid at room temperature and have a viscosity of at least 10 mPas at 25° C.

As catalysts it is possible to use all known compounds which accelerate the formation of siloxane bonds. Examples of catalysts of this kind are organotin compounds such as dibutyltin dilaurate, dibutyltin diacetate, dibutyltin oxide, dioctyltin dilaurate, dioctyltin diacetate, dioctyltin oxide, and their reaction products with alkoxysilanes such as tetraethoxysilane, for example. Further examples of catalysts are titanium compounds such as tetraisopropyl titanate, tetrabutyl titanate and titanium chelates, and also the corresponding zirconium or hafnium compounds.

Examples of organic solvents which are inert in respect of the dispersions are hydrocarbons such as petroleum ethers of various boiling ranges, n-pentane, n-hexane, hexane isomer mixtures, toluene, and xylene.

Of each of the groups of substances specified above as a possible component for the aqueous dispersions of the invention it is possible in each case to use one substance from that group or else a mixture of at least two different of these substances.

The aqueous dispersions of organopolysiloxanes of the invention preferably possess pH values from 3 to 13, more preferably from 5 to 13, more preferably from 6 to 11, and with particular preference from 6 to 9.

In the case of the aqueous dispersions of organopolysiloxanes of the invention it is possible to achieve solids contents of up to 95 percent by weight. Lower solids contents are of course possible. Even in the case of aqueous silicone dispersions of the invention which contain no further fillers it is possible to obtain a solids content of more than 90%. The solids content here means the weight fraction of all of the constituents of the dispersion with the exception of water and, if used, organic solvent, as a proportion of the total weight of the dispersion.

The aqueous dispersions of organopolysiloxanes of the invention may be flow-resistant or fluid, depending on the application.

The organosiloxane dispersions of the invention are preferably those prepared using components (A), (B), (C), (D) and, if desired, (E) and (F). Further substances are preferably not used.

In principle the aqueous dispersions of the invention may be prepared by any desired processes known to date, such as by simple mixing of the components employed, for example. However, a substantially simplified and hence economic mode of preparation arising from the inventive composition of the aqueous dispersions of organosilicon compounds is a process (process 1) which comprises mixing all of the constituents of the dispersion, with the exception of filler (E), with one another and jointly dispersing them. Thereafter it is possible, if desired, to incorporate the filler (E) immediately into the dispersion.

According to another procedure (process 2) all of the constituents of the dispersion with the exception of component (D) and filler (E) are mixed with one another and jointly dispersed. Thereafter, if desired, component (D) and, if desired, filler (E) are incorporated into the dispersion.

According to another procedure (process 3) component (A1) is introduced initially, component (A2) is mixed in and, if desired, components (E) and (G) are admixed. Then water (C) is introduced initially, particles (B) are dispersed, then mixture A1+A2 with, where appropriate, (E) and (G) is added and the system is emulsified. Thereafter, if desired, component (D) and, if desired, filler (E) are incorporated into the dispersion.

According to another procedure (process 4) component (A1) is introduced initially, (A2) is mixed in and, if desired, components (E) and (G) are admixed. Then particles (B) are introduced initially and, with stirring, an aerosol of water (C) is admixed or sprayed on. Subsequently particles (B), coated with water (C), are dispersed in mixture (A1)+(A2)+if desired (E)+if desired (G) and the system is emulsified. If desired it is possible subsequently, in order to set the desired properties, such as viscosity, for example, to mix in additional water or to remove excess water by means of known techniques, such as heating. Thereafter, if desired, component (D) and, if desired, filler (E) are incorporated into the dispersion.

According to a further procedure (process 5) (A1) is introduced initially, (A2) is mixed in, and, if desired, components (E) and (G) are admixed. Then water (C) is introduced initially and, with stirring, particles (B) are admixed into the water (C). Subsequently the mixing consisting of particle (B) and water (C) is dispersed into the mixture (A1)+(A2)+if desired (E)+if desired (G) and the system is emulsified. If desired, it is then possible, in order to set desired properties such as viscosity, to mix in additional water or to remove excess water by means of known techniques such as heating. Thereafter, if desired, component (D) and, if desired, filler (E) are incorporated into the dispersion.

According to another procedure (process 6-3), (process 6-4) or (process 6-5), if desired, components (D) and (F) are first dissolved in water (C) and the subsequent procedure is as for process versions 3, 4 or 5.

Preferably the dispersions of organosilicon compounds of the invention are prepared in accordance with the inventive process versions 2, 3, 4, 5 and 6, with process version 2 being particularly preferred.

The emulsifying or dispersing can take place in customary mixing equipment suitable for preparing emulsions or dispersions and providing a sufficiently high input of shear energy, such as, for example, high-speed stator-rotor stirrers, such as of the type according to Prof. P. Willems, for example, known under the brand name Ultra-Turrax®, or other stator-rotor systems, known under the brand names Kady, Unimik, Koruma, Cavitron, Sonotron, Netzsch, IKA or Ystral. Other possible techniques are ultrasound techniques such as ultrasonic fingers/transmitters or ultrasonic flow cells or ultrasonic systems of the kind, or analogous to the kind, supplied by Sonorex/Bandelin, or ball mills, such as Dyno-Mill from WAB, CH, for example. Further possible techniques are carried out using high-speed stirrers, such as paddle stirrers or straight-arm stirrers, dissolvers such as disc dissolvers, e.g., from Getzmann, or mixer systems such as planetary dissolvers, straight-arm dissolvers or other combined units comprising dissolver systems and stirrer systems. Other suitable systems are extruders or compounders. The processes of the invention can be carried out either batchwise or continuously.

The inventive dispersion of organosilicon compounds can of course also be prepared in other ways. It has been found, however, that the procedure is somewhat critical and that, for example, not all modes of preparation result in dispersions which following removal of water lead to elastomers. Thus, the processes as described are preferably followed.

The processes of the invention have the advantage that they are very simple to carry out and that it is possible to prepare aqueous dispersions having very high solids contents.

The aqueous dispersions of organopolysiloxanes can be used for all those purposes for which aqueous dispersions have been used to date. In particular the aqueous dispersions of organosilicon compounds according to the invention may serve, for example, as sealants and adhesives, paints, coating systems, and as electrically insulating or conducting, hydrophobic or tacky-substance-repelling coating systems, or as a base for and/or addition to such systems.

The aqueous dispersions of organopolysiloxanes which crosslink on removal of water cure even at room temperature within a very short time following evaporation of the solvent fraction, i.e., of water and, where appropriate, organic solvent, to form elastomers or resins.

The present invention additionally provides moldings produced by crosslinking the dispersions of the invention based on organosilicon compounds containing condensable groups.

The aqueous dispersions of the invention have the advantage that they can be easily prepared, and that they exhibit a high stability in storage. The aqueous dispersions of the invention also have the advantage that there is no need for any organic emulsifiers at all, and that therefore, among other qualities, the water resistance of the contact areas between the resultant moldings and the substrates is greatly improved.

The aqueous dispersions of the invention have the further advantage that their rheology, in contrast to that of systems known to date, can be formulated in regions which are like those known for nonaqueous systems, and that furthermore, the mechanical properties of the cured products are within ranges such as are known for the nonaqueous systems.

The aqueous dispersions of the invention have the advantage, in addition, that they can be formulated in such a way that no volatile organic compounds at all are emitted to the atmosphere on curing. The aqueous dispersions of the invention have the advantage, moreover, that on numerous substrates, such as paper, textiles, mineral building materials, plastics, wood and many other supports, they form firmly adhering coatings. Coating may take place in this case by means for example of brushing, rolling, dipping or spraying.

One preferred field of use involves the use of the dispersions as sealants, adhesives and coating materials. Examples that may be mentioned include joint sealants for facings and buildings and for glazing systems, and also for use as sealants in the sanitary sector. Examples of coatings include façade coatings and façade impregnation systems, elastic masonry paints, textile coatings and fabric coatings.

In the examples described below all parts and percentages are by weight unless otherwise indicated. Moreover all viscosity figures relate to a temperature of 25° C. Unless otherwise specified the examples below are carried out under the pressure of the surrounding atmosphere, i.e., between 900 and 1100 hPa, and at room temperature, i.e., at about 22° C. or at a temperature which is established when the reactants are combined at room temperature without additional heating or cooling.

The elastomer properties are determined in each case in accordance with the following, standardized tests:

| | |
|---|---|
| Breaking strength | DIN 53504 S2 |
| Breaking elongation | DIN 53504 S2 |
| Modulus | DIN 53504 S2 |
| Shore A hardness | DIN 53505 |

EXAMPLE 1

Preparation of Particulate Solids B1

100 g of a pyrogenic silica having a specific BET surface area, measured in accordance with DIN 66131 and DIN 66132, of 200 m$^2$/g (available from Wacker-Chemie GmbH, D-Munich under the name Wacker HDK® N20) are fluidized with stirring at 1000 rpm with a stirrer paddle diameter of 12.5 cm, then subjected for 15 minutes to nitrogen gas and rendered inert, after which the stream of nitrogen is shut off again. Then 2 g of dimethyldichlorosilane in aerosol form are sprayed on into the fluidized silica using a two-fluid nozzle, at a temperature of about 25° C. and an ambient pressure of about 1013 hPa. After 30 minutes of further stirring the silica thus treated is then heat-treated at 300° C. for 2 hours in an oven with a capacity of 100 l under a gentle stream of nitrogen of 1000 l/h. This gives a white pulverulent silica having the following properties:

the silica is somewhat water-wettable but not completely; this is evident in the fact that only 12% by weight of the silica can be incorporated into water using an Ultraturrax to form a fluid mass which is stable for one day, whereas under the same conditions and at the same viscosity 24% by weight of the starting silica (Wacker HDK® N20), which is completely water-wettable, can be so incorporated.

further properties of the silica are summarized in Table 1.

TABLE 1

| Property | Silica B1 according to Example 1 |
|---|---|
| BET surface area | 184 m$^2$/g |
| Residual amount of nonsilylated silica silanol groups | 80% |
| Carbon content % C | 0.5% by weight |
| Methanol number | 0 |
| Contact angle THETA Method-1 against water and air | 84° |
| Contact angle THETA Method-2 against water and air | 80° |
| Surface energy GAMMA | 69 mJ/m$^2$ |
| Dispersion component of the surface energy GAMMA-s-D | 65 mJ/m$^2$ |

Specific BET surface area, measured in accordance with DIN 66131 and DIN 66132

Residual amount of nonsilylated silica silanol groups, obtained as the ratio (a) of the amount of silica silanol groups, of the silica prepared as stated above, divided by the amount of the silica silanol groups of the untreated starting silica (Wacker HDK® N20); the amount of silica silanol groups is determined by acid-based titration (in analogy to G. W. Sears, Anal. Chem. 28 (12), (1950), 1981). Method: acid-based titration of the silica in suspension in water/methanol=50:50; titration in the region above the pH range of the isoelectric point and below the pH range of dissolution of the silica; untreated silica with 100% SiOH (silica surface silanol groups): SiOH-phil=1.8 SiOH/nm$^2$; silylated silica: SiOH-silyl; residual amount of nonsilylated silica silanol groups: % SiOH=SiOH-silyl/SiOH-phil 100%

Carbon content % C determined by means of elemental analysis for carbon; combustion of the sample at more than 1000° C. in a stream of O$_2$, detection and quantification of the resultant CO$_2$ by IR; instrument LECO 244

Methanol number, measured as follows: test (% by volume MeOH in water) of wettability with water-methanol mixtures=methanol number (MN): an equal volume of the silica is shaken in with an equal volume of water/methanol mixture; start with 0% methanol; in the case of nonwetting, silica floats: a mixture with an MeOH content higher by 5% by volume is to be used; in the case of wetting, silica sinks: fraction of MeOH (%) in water gives methanol number (MN)

Contact angle THETA Method-1 against water, measured as follows: the contact angle of the particles is obtained by careful preparation, by customary methods, of a compact of the silica with subsequent determination of the contact angle against water, in this case a drop of double-distilled water lying on the surface, in air, by digital image evaluation.

The contact angle θ defines the ratio of the surface tensions and surface energies γ of liquids (l) and solids (s) in a gas space (g) as follows.

$$\cos(\theta)=(\gamma(sg)-\gamma(sl))/\gamma(lg)$$

The surface energy (mJ/m$^2$) of a solid is equal in dimension to the surface tension of a liquid (mN/m), since it is the case that [J]=[N*m].

Contact angle THETA Method-2 against water, measured as by means of an imbibition method using the Lucas- Washburn equation, based on the inward suction of known and defined liquid, with known surface tension, into a defined accumulation, such as, in this case, a compact of the silica, with a low level of compaction, with an open porosity of more than 0.25 and pore radius r. The upward suction rate dh/dt, and the height of the liquid column sucked up, h, calculated from the mass increase m in liquid through the particle accumulation against the time t, and also of the viscosity of the liquid sucked up, $\eta$, and the surface tension $\gamma$ of the liquid sucked up make it possible, given a known particle radius r by means of the Lucas-Washburn equation (Washburn, E. W., Phys. Rev. 17, 273 (1921) and R. Lucas, Colloid Z. 23, 15 (1918)) to determine the cosine value of $\theta$ ($\cos(\theta)$) and hence the contact angle $\theta$ of the liquid against the particle surface; following J. Schoelkopf et al, J. Colloid. Interf. Sci. 227, 119-131 (2000)

As a liquid of known surface tension use is made of methanol/water mixtures in the following proportions (volume of methanol to volume of water): 0:100, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, 100:0.

$$dh/dt = r*\gamma*\cos(\theta)/(4*\eta)$$

and $$h^2 = r*\gamma*t*\cos(\theta)/(2*\eta)$$

$$t = A \cdot m^2: \text{Washburn equation}$$

where:
t: time
m: mass of liquid drawing in by suction $$A = \frac{\eta}{\{C \cdot p^2 \cdot \gamma \cdot \cos\vartheta\}}$$

Figure 1B:
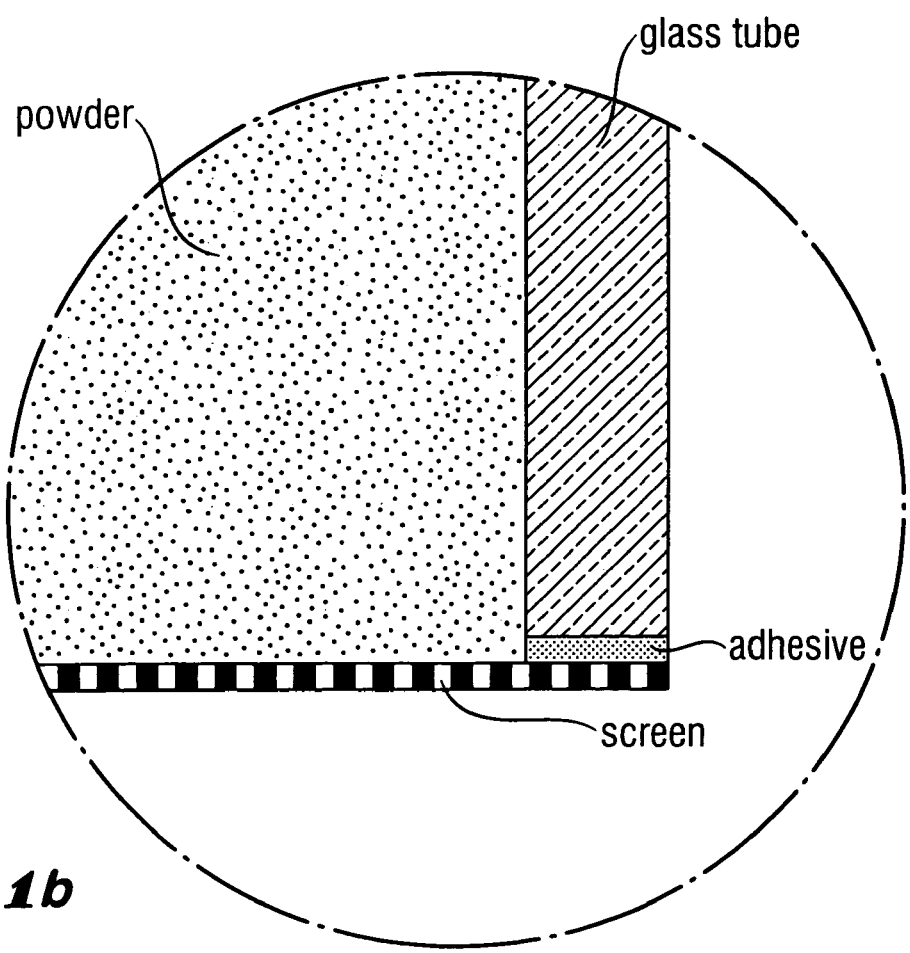

$\eta$: viscosity of the liquid
p: density of the liquid
$\gamma$: surface tension of the liquid
$\upsilon$: liquid/powder contact angle
C: factor dependent only on the geometric properties of the powder and sample tube An illustration of the measurement method can be found in FIGS. 1a and 1b.

Figure 2:
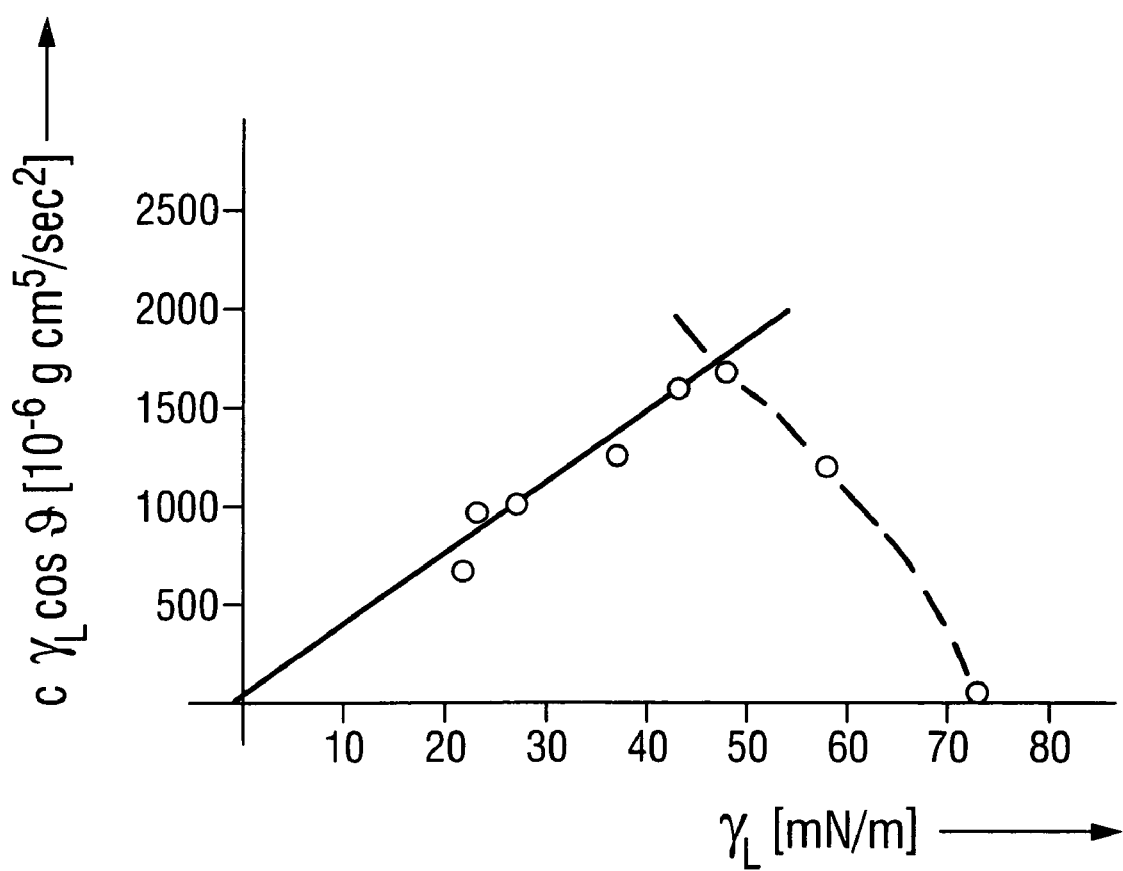
FIG. 2 is a Zisman plot of a partly water wettable silica in accordance with one embodiment of the subject invention.

The surface energy GAMMA can be determined for particles in the form of the critical surface energy GAMMA-crit by means of a Zisman plot, which as given in FIG. 2 plots the respective contact angle THETA of the silica against a defined liquid, as determined above by the imbibition method, against the contact angle of the respective liquids For particles such as pyrogenic silica which form agglomerates having bulk densities $d_{bd} \ll 1$ g/ml that are composed of primary particles having material densities $d_{md} > 1$ g/ml it is possible to employ a method of shaken incorporation into liquids differing in surface tension: in the case of nonwetting, the particle agglomerates float; in the case of wetting, the air in the agglomerates is displaced and the particle agglomerates sink.

Using different liquids differing in surface tension allows a precise determination to be made of the surface tension of a liquid, where the particle agglomerates sink; this provides the critical surface energy $\gamma_{crit}$ as a measure of the surface energy $\gamma$ of the particles.

The method can also be simplified by lowering the surface tension of water (72.5 mN/m) by adding methanol, ethanol or isopropanol. Typically it is possible to introduce water, to place a defined amount of particle agglomerates (floating) on the water surface and then to titrate in the alcohol, with stirring. The water-to-alcohol ratio when the particle agglomerates sink is recorded and the surface tension is determined precisely for this water:alcohol ratio in a separate experiment using standard methods (ringed attachment method, Wilhelmy method). More effectively, and as carried out here, defined mixtures of water with methanol are prepared, and then the surface tensions of these mixtures are determined. In a separate experiment these water:methanol mixtures are overlayered with defined amounts of particle agglomerates (for example, in a 1:1 volume ratio) and shaken under defined conditions (for example, gentle shaking by hand or using a tumble mixer for about 1 minute). A determination is made of the water:methanol mixture in which the particle agglomerates still just do not sink and of the water:methanol mixture with a higher methanol content in which the particle agglomerates do just sink. The surface tension of the latter methanol:water mixture gives the critical surface energy $\gamma_{crit}$ as a measure of the surface energy $\gamma$ of the particles, as provided in Table 1.

The dispersions component of the surface energy, gamma-s-D, is determined by inverse gas chromatography with alkanes as probes, in accordance with "Inverse Gas Chromatography"—"Characterization of Polymers and other Materials", 391 ACS Symposium Series, D R Lloyd, Th C Ward, H P Schreiber, Chapter 18, pp 248-261, ACS, Washington D.C. 1989, ISBN 0-8412-1610-X.

In a 500 ml stainless steel beaker, 10 g of fully demineralized (FD) water and 5 g of the particulate solids B1 whose preparation was described above are predispersed by means of a high-speed stator-rotor stirring device in accordance with Prof. P. Willems, known under the brand name Ultra-Turrax®. Incorporated into this high-viscosity mixture by stirring, with continual mixing with the Ultra-Turrax®, is a mixture of 75 g of a long-chain OH-terminated polydimethylsiloxane having a viscosity of 80,000 mpas (available commercially under the name "Polymer FD 80" from Wacker-Chemie GmbH, D-Munich), 4 g of a methylsilicone resin of average formula $[(CH_3)_2SiO]_{0.2}[(CH_3)SiO_{3/2}]_{0.8}$ having an average molecular weight of 3000, an average residual ethoxy content of 2.6 percent by weight, based on the resin molecule, and a viscosity of 110,000 mPas and 4 g of an MQ resin of average formula $[(CH_3)_3SiO_{1/2}]_{1.1}[SiO_2]$ having an average molecular weight of 2000 and an average residual ethoxy content of 2.1 percent by weight, based on the resin molecule. This gives a high-viscosity, flow-resistant, white oil-in-water (o/w) emulsion having a storage stability in a closed system at room temperature of at least 12 months.

The flow-resistant emulsion thus prepared is admixed in a planetary mixer in succession with 0.8 g of N-(2-aminoethyl)-3-aminopropyltrimethoxysilane, 0.8 g of 2-amino-2-methyl-1-propanol, 0.5 g of potassium N-(2-aminoethyl)-3-aminopropylmethylsiloxide and 60 g of ground calcium carbonate (available commercially under the name OMYAC-ARB®5-GU from Omya, D-Cologne) plus a further 15 g of fully demineralized water. This gives a creamy white, smooth, permanently homogeneous, flow-resistant composition. The properties of the dispersion on storage in the absence of air for a period of more than 1 year are unchanged.

The resulting dispersion of organopolysiloxanes is used to produce films 2 mm thick, by applying the aqueous dispersion to a polytetrafluoroethylene surface and allowing the water to evaporate at room temperature. The dry, elastic films which form were investigated after 7 days for their elastomer properties. The films exhibit a stress at 100% elongation of 0.32 MPa, a tensile strength of 1.2 MPa, a Shore A hardness of 18 and a breaking elongation of 620%.

EXAMPLE 2

A mixture of 75 g of a long-chain, OH-terminated polydimethylsiloxane having a viscosity of 80,000 mPas (available under the name "Polymer FD 80" from Wacker-Chemie GmbH, D-Munich), 4 g of a methylsilicone resin of the average formula $[(CH_3)_2SiO]_{0.2}[(CH_3)SiO_{3/2}]_{0.8}$ having an average molecular weight of 3000, an average residual ethoxy content of 2.6 percent by weight, based on the resin molecule, and a viscosity of 110,000 mPas and 4 g of an MQ resin of the average formula $[(CH_3)_3SiO_{1/2}]_{1.1}[SiO_2]$ having an average molecular weight of 2000 and an average residual ethoxy content of 2.1 percent by weight, based on the resin molecule, and also 60 g of ground calcium carbonate (available commercially under the name OMYACARB®5-GU from Omya, D-Cologne) are dispersed in a planetary mixer. Incorporated into this high-viscosity mixture by dispersion are 15 g of a mixture of 5 g of particulate solids B1, whose preparation is described in Example 1, and 10 g of water (fully demineralized; FD) in a Labo-Top planetary dissolver from PC Laborsystem, CH, followed by stirring for 1.5 hours. This gives a high-viscosity, flow-resistant, white oil-in-water (o/w) emulsion having a storage stability in a closed system at room temperature of at least 12 months.

The flow-resistant emulsion prepared in this way is admixed in a planetary mixer in succession with 0.8 g of N-(2-aminoethyl)-3-aminopropyltrimethoxysilane, 0.8 g of 2-amino-2-methyl-1-propanol, 0.5 g of potassium N-(2-aminoethyl)-3-aminopropylmethylsiloxide and a further 15 g of FD water. This gives a creamy white, smooth, permanently homogeneous, flow-resistant composition. The properties of the dispersion are unchanged on storage in the absence of air for a period of more than 1 year.

The dispersion of organopolysiloxanes obtained in this way is used to produce films 2 mm thick, by applying the aqueous dispersion to a surface made of polytetrafluoroethylene and allowing the water to evaporate at room temperature. The dry elastic films which form were investigated after 7 days for their elastomer properties. The films exhibit a stress at 100% elongation of 0.30 MPa, a tensile strength of 1.1 MPa, a Shore A hardness of 18 and a breaking elongation of 570%.

EXAMPLE 3

A mixture of 75 g of a long-chain OH-terminated polydimethylsiloxane having a viscosity of 20,000 mPas (available under the name "Polymer FD 20" from Wacker-Chemie GmbH, D-Munich), 4 g of an MQ resin of the average formula $[(CH_3)_3SiO_{1/2}]_{1.1}[SiO_2]$ having an average molecular weight of 2000 and an average residual ethoxy content of 2.1 percent by weight, based on the resin molecule, and 60 g of ground calcium carbonate (available commercially under the name OMYACARB®5-GU from Omya, D-Cologne) are dispersed in a planetary mixer. Incorporated into this high-viscosity mixture with dispersion are 15 g of a mixture of 5 g of particulate solids B1, whose preparation is described in Example 1, and 10 g of water (FD), in a Labo-Top planetary dissolver from PC Laborsystem, CH, followed by stirring for 1.5 hours. This gives a high-viscosity, flow-resistant, white oil-in-water (o/w) emulsion having a storage stability in a closed system at room temperature of at least 12 months.

Further compounding of the resultant emulsion takes place as described in Example 2. This gives a creamy white, smooth, permanently homogeneous, flow-resistant composition. The properties of the dispersion are unchanged on storage in the absence of air for a period of more than 1 year.

The organopolysiloxane dispersion obtained in this way is used to produce films 2 mm thick, by applying the aqueous dispersion to a surface of polytetrafluoroethylene and allowing the water to evaporate at room temperature. The dry elastic films which formed were investigated after 7 days for their elastomer properties. The films exhibit a stress at 100% elongation of 0.53 MPa, a tensile strength of 1.5 MPa, a Shore A hardness of 30 and a breaking elongation of 380%.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An aqueous dispersion prepared from ingredients, comprising:
   (A) at least one organic compound selected from the group consisting of organosilicon compounds, polyurethanes and their precursor compounds, crosslinked (poly)epoxides and their precursor compounds, (poly)amines, (poly)amidoamines, (poly)mercaptans, (poly)carboxylic acids, (poly)carboxylic anhydrides, acrylates and their precursor compounds, and polysulfide-forming polymers,
   (B) dispersant particles partially wettable with water, and
   (C) water.

2. The aqueous dispersion of claim 1, which is substantially free from conventional, nonparticulate, purely organic surface-active substances which are solid or liquid at room temperature under the pressure of the surrounding atmosphere.

3. The aqueous dispersion of claim 1, wherein component (A) comprises at least one organosilicon compound comprising units of the formula $$R_a(OR^1)_b X_c SiO_{(4-a-b-c)/2} \qquad (I),$$

where
   R are identical or different SiC-bonded hydrocarbon radicals having 1 to 18 carbon atoms, unsubstituted or substituted by halogen atoms, amino groups, ether groups, ester groups, epoxy groups, mercapto groups, cyano groups or (poly)glycol radicals, the latter comprising oxyethylene and/or oxypropylene units,
   $R^1$ each is identical or different and denotes a hydrogen atom or an unsubstituted or substituted hydrocarbon radical optionally interrupted by oxygen atoms,
   X each is identical or different and denotes a halogen atom, pseudohalogen radical, Si—N-bonded amine radical, amide radical, oxime radical, aminoxy radical or acyloxy radical,
   a is 0, 1, 2 or 3,
   b is 0, 1, 2 or 3 and
   c is 0, 1, 2 or 3, with the proviso that the sum of a+b+c is less than or equal to 4.

4. The aqueous dispersion of claim 1, wherein the particles (B) have an average diameter of from 1 to 5000 nm.

5. The aqueous dispersion of claim 1, wherein component (B) comprises at least one inorganic, partly water-wettable oxide.

6. The aqueous dispersion of claim 1, comprising component (B) in an amount of from 0.1 to 50 parts by weight, based on 100 parts by weight of total dispersion.

7. The aqueous dispersion of claim 3 comprising a dispersion containing:
   (A) at least one organosilicon compound comprising units of the formula (I),
   (B) particles which are partly wettable with water,
   (C) water, and
   (D) compounds containing basic nitrogen.

8. The aqueous dispersion of claim 1, wherein component (A) comprises at least in part organosilicon compounds containing condensable groups.

9. The aqueous dispersion of claim 1, wherein a component (D), a compound containing basic nitrogen, is present.

10. A molding prepared by crosslinking the dispersion of claim 8.

11. A molding prepared by crosslinking the dispersion of claim 9.

12. An aqueous dispersion, comprising
   a) a dispersed phase comprising at least one organic compound selected at least one organic compound selected from the group consisting of organosilicon compounds, polyurethanes and their precursor compounds, crosslinked (poly)epoxides and their precursor compounds, (poly)amines, (poly)amidoainines, (poly)mercaptans, (poly)carboxylic acids, (poly)carboxylic anhydrides, acrylates and their precursor compounds, and polysulfide-forming polymers,
   b) a continuous aqueous phase, and
   c) a further, solid dispersant phase comprising metal oxide particles which are partially wettable with water.

13. The dispersion of claim 12, which further contains an organic surface active substance in a maximum concentration which does not exceed 0.1 times the critical micelle concentration of said surface active substance.

14. The dispersion of claim 13, wherein said surface active substance is an emulsifier.

15. The dispersion of claim 12, further comprising an organic emulsifier in a concentration of less than 2% by weight relative to the total weight of the dispersion.

16. The dispersion of claim 12, further comprising an organic emulsifier in a concentration of less than 1% by weight relative to the total weight of the dispersion.

17. The dispersion of claim 12, which contains 0% by weight of organic surface active substances.

18. The dispersion of claim 12, wherein the solid dispersant phase particles have a contact angle from 0° to 180° measured at the water-air phase boundary at a temperature of 25° C., and which have a surface energy gamma of from 30 to 72.5 mJ/m² at 25° C.

19. The dispersion of claim 12, wherein the solid dispersant phase particles have a contact angle from 30° to 150° measured at the water-air phase boundary at a temperature of 25° C., and which have a surface energy gamma of from 30 to 72.5 mJ/m² at 25° C.

20. The dispersion of claim 18, wherein the dispersant is silica having a density of surface silanol groups SiOH between 0.9 to 1.7 SiOH groups/nm² of particle surface area.

21. A stable aqueous dispersion, comprising:
   (A) at least one organosilicon compound comprising units of the formula $$R_a(OR^1)_b X_c SiO_{(4-a-b-c)/2} \quad (I),$$

where
   R are identical or different SiC-bonded hydrocarbon radicals having 1 to 18 carbon atoms, unsubstituted or substituted by halogen atoms, amino groups, ether groups, ester groups, epoxy groups, mercapto groups, cyano groups or (poly)glycol radicals, the latter comprising oxyethylene and/or oxypropylene units,
   $R^1$ each is identical or different and denotes a hydrogen atom or an unsubstituted or substituted hydrocarbon radical optionally interrupted by oxygen atoms,
   X each is identical or different and denotes a halogen atom, pseudohalogen radical, Si—N-bonded amine radical, amide radical, oxime radical, aminoxy radical or acyloxy radical,
   a is 0, 1, 2 or 3,
   b is 0, 1, 2 or 3 and
   c is 0, 1, 2 or 3, with the proviso that the sum of a+b+c is less than or equal to 4,
   (B) dispersant particles partially wettable with water,
   (C) water,
   (D) at least one compound containing basic nitrogen,
   (E) optionally one or more inorganic fillers,
   (F) optionally, one or more additives selected from the group consisting of adhesion promoters, plasticizers, foam preventatives, thixotropic agents, dispersants, pigments, soluble dyes, fungicides, catalysts, odorants, and organic solvents which are inert in respect of the dispersions; and
   (G) optionally one or more catalysts,
   wherein without ingredient (B), the remaining ingredients do not form a storage stable dispersion.

22. The composition of claim 21, consisting essentially of (A), (B), (C), (D), (E), (F), and (G).

23. The composition of claim 22, wherein dispersant particles (B) have a contact angle from 0° to 180° measured at the water-air phase boundary at a temperature of 25° C., and which have a surface energy gamma of from 30 to 72.5 mJ/m² at 25° C.

* * * * *